United States Patent

Belligoi et al.

[11] Patent Number: 6,103,004
[45] Date of Patent: Aug. 15, 2000

[54] MATTING AGENT BASED ON AGGREGATED SILICA

[75] Inventors: Peter Belligoi, Worms, Germany; Rex Field, Arcola, Ill.; Georg Luers, Westhofen; Rita Schneider, Worms, both of Germany

[73] Assignee: Grace GmbH, Worms, Germany

[21] Appl. No.: 08/945,513

[22] PCT Filed: Apr. 23, 1996

[86] PCT No.: PCT/EP96/01682

§ 371 Date: Apr. 6, 1998

§ 102(e) Date: Apr. 6, 1998

[87] PCT Pub. No.: WO96/34062

PCT Pub. Date: Oct. 31, 1996

[30] Foreign Application Priority Data

Apr. 26, 1995 [DE] Germany .................... 195 16 253

[51] Int. Cl.[7] .................... C01B 33/157; C09C 1/30; C09D 7/00; C12H 1/048
[52] U.S. Cl. .................... 106/482; 106/485; 106/486; 106/491; 516/111; 516/106; 426/423; 426/330.4
[58] Field of Search .................... 516/106, 111; 106/485, 486, 491, 482; 426/423, 330.4

[56] References Cited

U.S. PATENT DOCUMENTS

| 3,607,337 | 9/1971 | Eisenmenger | 106/491 |
|---|---|---|---|
| 3,892,577 | 7/1975 | Sugahara et al. | 106/14.12 |
| 4,097,302 | 6/1978 | Cohen et al. | 106/312 |
| 4,150,101 | 4/1979 | Schmidt et al. | 423/338 |
| 4,225,464 | 9/1980 | Scholten et al. | 502/237 |
| 5,011,690 | 4/1991 | Garvey et al. | 424/401 |
| 5,034,207 | 7/1991 | Kerner et al. | 423/339 |
| 5,112,587 | 5/1992 | Von Wedel et al. | 423/235 |
| 5,221,337 | 6/1993 | Luers et al. | 106/266 |
| 5,342,876 | 8/1994 | Abe et al. | 524/493 |
| 5,795,649 | 8/1998 | Cosentino et al. | 428/336 |

FOREIGN PATENT DOCUMENTS

| 0442325 | 8/1991 | European Pat. Off. . |
| 0651601 | 5/1995 | European Pat. Off. . |
| 4132230 | 1/1993 | Germany . |
| 1508992 | 4/1978 | United Kingdom . |
| 8607345 | 12/1986 | WIPO . |

*Primary Examiner*—C. Melissa Koslow
*Attorney, Agent, or Firm*—Charles A. Cross

[57] ABSTRACT

The invention relates to an aggregated silica gel which has been produced from silica gel particles having a particle size of 1 to 20$\mu$, a surface of 200 to 1000 m$^2$/g and a specific pore volume of 0.4 to 2.5 ml/g and a binding agent selected from synthetic or natural phyllosilicate, pyrogenic silicon dioxide and organic polymers soluble in water or dispersible in water. Aggregation takes place by spray-drying a suspension having 1 to 25% solids. The product is suitable as a matting agent for coatings, as an antiblocking agent for polymer films and as a beer clarifying agent.

19 Claims, No Drawings

MATTING AGENT BASED ON AGGREGATED SILICA

Modern matting agents for coatings consist of highly porous, amorphous silicon dioxide which has been adjusted to a particle size which is appropriate for the required coating film thickness.

The most widely used matting agents originate from two processes:

gelation of silicic acid, washing, drying, milling precipitation of silicic acid in such a way that a "reinforced" structure is formed, washing, drying, milling.

The best representatives of both processes show a high matting efficiency coupled with low thickening, good dispersibility and lacquer film transparency (clarity). SYLOID ED5, which is manufactured by Grace GmbH, Worms, Germany, is a typical representative of the first class and is used throughout this description as a standard for the state of the art.

Another type of matting agent has also been developed which exhibits an increased matting efficiency compared with the two aforementioned classes. This is attained by agglomerating in various ways a pyrolytic (pyrogenic, fumed) silicon dioxide (silica) (pyrolytic silicon dioxide is obtained by flame hydrolysis of $SiCl_4$). This type of product (e.g. TS 100 from Degussa) exhibits a matting efficiency which is increased by 10 to 25% compared with the first two types. However, it is a major disadvantage of this type of product that it increases the viscosity of the paint (lacquer) in which it is used, even at the lower concentrations which are required in order to obtain the same gloss as with the other products. This increase in viscosity makes processing of the paint more difficult. A further disadvantage is the reduced dispersibility.

DE 12 09 108 describes the spray-drying of an aqueous suspension containing 20 to 60% pyrolytic silicon dioxide in order to obtain a spherical product having an average particle size of approx. 200 $\mu$m.

DE 24 14 478 describes the production of a matting agent by aggregation of powdery pyrolytic silicon dioxide. The silicon dioxide is wetted by adding approx. 5% of water, based on silicon dioxide, and then dried in an oven or an air-jet mill. The surface of the powder is coated only with a very thin (monomolecular) layer because of low moisture absorption. During subsequent evaporation, aggregation takes place which leads to a product which has a relatively poor particle strength.

DE 28 31 561 describes the production of a catalyst support by spray-drying a suspension of pyrolytic silicon dioxide having a concentration of 10 to 33% and optionally by adding ammonia. The particle size is 40 to 80 $\mu$m.

EP 0 341 383 describes a precipitated silicon dioxide with a high "structure", expressed as dibutyl phthalate (DBP) number of 3.0 to 4.0, which corresponds to a high pore volume. In the described process a spray-dryer is used. Given as a possible application is that as matting agents in paints (lacquers).

DE 41 32 230 describes the use of large particles (15 to 100 $\mu$m) which were obtained by spray-drying a suspension of milled silicon dioxide hydrogel. These particles are used as texturing aid for coatings. The used additives have the purpose of producing particles which do not form solid deposits during sedimentation in the liquid paint (lacquer) as a result of standing for a relatively long time. They do not have binding properties. The stability of aggregates decreases with use.

It is the object of the present invention to obtain a matting agent which has an efficiency which is 25% greater than that of products known from the prior art, without exhibiting a correspondingly greater thickening at the same gloss. Other important properties such as dispersibility, surface roughness and transparency (clarity) of the resulting hardened film are not to be negatively impaired either.

This object is achieved by an aggregated silica gel which has been produced from silica gel particles (particle size: 1 to 20$\mu$, surface: 200 to 1000 m$^2$/g, specific pore volume: 0.4 to 2.5 ml/g) and binding agent selected from synthetic or natural layered silicate (phyllosilicate), pyrogenic silicon dioxide and organic polymers soluble in water or dispersible in water.

According to the invention a micronized silica gel having a pore volume of 0.4 to 2.0 ml/g, preferably 1.5 to 1.9 ml/g and in particular 1.6 ml/g, a particle size of 2 to 6 $\mu$m, preferably 3 to 4 $\mu$m and in particular 4 $\mu$m (light diffraction method; Helos Particle Size Analyzer, Sympatec GmbH, Clausthal-Zellerfeld, Germany) and a surface of 200 to 1000 m$^2$/g, preferably 300 to 450 m$^2$/g is suspended in water. A binding agent selected from synthetic or natural layered silicate (phyllosilicate), pyrogenic silicon dioxide and organic polymers soluble in water or dispersible in water is dispersed in this suspension using a dissolver for agitation. A surfactant can be added in order to reduce the viscosity and to permit higher solids concentrations. Aggregation takes place in a spray-dryer (Niro, Copenhagen, Type Minor 9). The suspension is atomized in a two-component nozzle (suspension throughput; 2 l/h, delivery pressure of the suspension: 500 mm water column, pressure of the compressed (sprayed) air: 2.5 bar above the ambient pressure, quantity of air: 20 m$^3$/h). The water of the formed suspension droplets is evaporated in a hot (inlet temperature: 350° C.) counter current air stream. The remaining solid aggregates are removed from the air stream using a cyclone followed by a filter. The coarse particles are then removed from the powder thus formed by screening (classification) in a sifter (Alpine Model MZR). The presence of this coarse fraction (approx. 10% of the total powder) would give the surface of the paint (lacquer) film a rough undesirable appearance.

When the binding agent is a synthetic or natural phyllosilicate, it is preferably used in a ratio of 1:99 to 25:75 silicate:silica gel. When the binding agent is a pyrolytic silicon dioxide, it is preferably used in a ratio of 5:95 to 50:50 pyrolytic silicon dioxide:silica gel. When the binding agent is selected from xanthane, carboxymethyl cellulose and polyacrylates, it is preferably used in a ratio of 0.5:99.5 to 15:85 organic polymer:silica gel.

Another possibility is to choose the spray conditions such that initially larger aggregates are formed. These are then adjusted to the desired size by milling, followed by classificating (screening). Milling and classificating (screening) can take place at the same time in a jet mill or in separate devices (mill, sifter). The advantage of the desired pore volume increase is retained by this process.

The product according to the invention exhibits a significantly improved matting efficiency compared with the silica gel starting product. This is a result of the additional pore volume (approx. 0.3 to 0.6 ml/g) between the particles of the aggregate (interaggregate volume). The particles themselves have their own internal pore volume.

A certain stability of the aggregate is necessary in order to withstand shear forces during dispersion of the matting agent into the paint. A comparison of the product according to the invention with a standard silicon dioxide matting agent (SYLOID ED5) gives comparable results in this respect (Table 5).

The function of the binding agent is to stabilize the aggregates. Although it is possible to aggregate the micronized silicon dioxide without binding agent, the stability of this type of aggregates is not sufficient (Table 5).

An optimum stability is achieved with 1 to 25%, preferably 8 to 12% of a layered silicate (phyllosilicate) such as Optigel SH from Sudchemie. In addition to the preferred synthetic silicate, natural (montmorillonite, hectorite) and synthetic layered silicates (such as laponite), pyrogenic (fumed) silicon dioxide and also organic polymers soluble in water or dispersible in water, such as xanthane, carboxymethyl cellulose (CMC) and polyacrylates are effective.

The thickening power of the matting agent according to the invention is lower than that of the standard SYLOID ED5 when compared at concentrations which are required to achieve the same gloss. This is surprising because in general a higher matting efficiency is associated with a higher thickening power (at the same concentrations), and, when comparing two matting agents at concentrations which lead to the same gloss, an at least equal thickening effect is expected. It is assumed that reasons for the lower viscosity are the spherical shape and the narrow distribution of the particles having a steepness of 0.7 to 1.0 (ED5 has a steepness of 1.2 to 1.45). The steepness of the particle size distribution is defined as $$St = \frac{d_{v,80} - d_{v,10}}{d_{v,50}}$$

($d_{v,x}$ are defined in DIN 66141).

The other effects of the silicon dioxide in the paint (lacquer) are comparable with those of the standard matting agent.

In order to improve the sedimentation properties of the products according to the invention, it can be treated with a wax selected from the classes of polyethylene waxes or mineral waxes and modifications thereof.

The products according to the invention can also be used as anti-blocking agents for polymeric films, as beer clarification agents, as thickening agents or abrasives in tooth pastes, in coatings for paper, as catalyst supports and for refining of edible oil.

EXAMPLES

Example 1

(Product according to the invention)

500 g SYLOID 244 (surface[1]: 410 m$^2$/g, specific pore volume[2]: 1.58 ml/g, particle size according to light diffraction method (Helos): 3.9 μm) were suspended in 5 l deionized water. 50 g Optigel SH from Sudchemie were added and a sodium hydroxide solution was used to adjust the pH value to 9. The suspension was then dispersed for 15 minutes using a 50 mm diameter dissolver blade at 2800 rpm. The suspension was left to stand undisturbed overnight. It was then stirred again at 2800 rpm for 5 minutes. Finally, coarse particles were removed by wet screening through a 100 μm mesh. The suspension was atomized (sprayed) using a two-component nozzle in which the drops were generated using compressed air (2.5 bar above atmospheric). An air stream entering in the spray direction having an inlet temperature of 350° C. was used to evaporate the water. The dried material was separated in a cyclone. The median of the volume-related particle size distribution (average volume equivalent particle size diameter) $d_{v,50}$ was adjusted by the pressure of the sprayed air to 10 to 14 μm (light diffraction method; Helos).

[1]Nitrogen adsorption (BET) DIN 66131
[2]Determined with the ASAP 2400 from Micromeritics The aggregates were then classified in a dynamic classifier (sifter) Alpin model MZR 100. The particle size was adjusted to a value of 9 to 12 μm by controlling the speed of rotation of the classifier (sifter).

This product was dispersed in a nitrocellulose paint (lacquer) and compared with the standard, SYLOID ED5. The results are given in Table 1. The amount of matting agent required to obtain a gloss level of 30 (angle of incidence 60°) was 24% lower in the case of the product according to the invention.

The material of Example 1 was also used to matt an alkyd paint (lacquer) (see Table 4). It was compared with the standard, SYLOID ED5, and with TS 100, which is one of the most efficient matting agents on the market and was produced by aggregating pyrolytic silicon dioxide. The matting efficiency of the product according to the invention was 18% better than that of the standard and 7% better than that of TS 100. More importantly however, the viscosity of the wet (liquid) paint (lacquer) which contained the product of Example 1 was equal to that of the standard SYLOID ED5, but was significantly lower than the viscosity which arises when using TS 100.

Example 2

(Agaregation without binding agent)

500 g SYLOID 244 (the same product as in Example 1) was treated exactly as in Example 1, without adding a binding agent, and spray dried under the same conditions as in Example 1. The results are given in Table 2. The efficiency of the product was not better than that of the standard SYLOID ED5.

Example 3

(Aggregation with organic binding agent)

3 l of water were heated to 80° C. and gently agitazed and 12 g xanthene were added in small portions. The hot solution was allowed to cool down after the organic thickening agent had completely dissolved. 398 g SYLOID 244 (the same product as in Example 1) were then added, and the mixture was treated as in Example 1 and spray dried under the same conditions as in Example 1. The results are given in Table 3. The efficiency was 13% better than that of the standard SYLOID ED5.

Example 4

(Aggregation with pyrolytic silicon dioxide)

287 g SYLOID 244 (the same product as in Example 1) were suspended in 3 l water. 123 g pyrolytic silicon dioxide (Aerosil 200) were added. The suspension was adjusted to a pH value of 9 by adding sodium hydroxide and spray dried under the same conditions as in Example 1. The results are given in Table 3. the efficiency was 16% better than that of the standard SYLOID ED5.

Example 5

(improved dispersibility)

10 g of the product produced in Example 1 were filled into a plastic bag measuring 10 cm×10 cm. A 40 kg weight was placed on it for 30 minutes. A sample of the standard SYLOID ED5 was treated in the same way. The dispersibility of the two samples was compared using a standardized dispersibility test (the product is dispersed for 40 seconds in a nitrocellulose paint (lacquer) using a paint shaker (Red Devil); the number of undispersed agglomerates in the dried paint film is used for characterizing the dispersibility). The film which contained the standard matting agent SYLOID ED5 was full of visible agglomerates, whilst the film which was matted with the product according to the invention was almost free of agglomerates. This is a significant improvement because SYLOID ED5 is regarded as one of the most dispersible products on the market (Tables 1 and 4).

TABLE 1

Performance of the aggregated matting agent

Application test in nitrocellulose paint

| Parameter | Unit | Standard SYLOID ED5 | Example 1 |
|---|---|---|---|
| Particle size $[d_{v,50}]$ (1) | μm | 8.8 | 9.2 |
| Matting agent required for 30 gloss units (60° angle of incidence) (2) | % wt./wt. | 0.62 | 0.47 |
| Matting agent required for 40 gloss units (85° angle of incidence) (2) | % wt./wt. | 0.72 | 0.45 |
| Viscosity of the paint with 1% matting agent (3) | mPa · s | 86 | 83 |
| Dispersibility (4) (low shear) | | good | good |
| Surface roughness Ra at the same gloss (5) | μm | 0.4 | 0.4 |

(1) measured according to Helos; focal length 50 mm; median of the volume distribution (DIN 66141)
(2) DIN 67530
(3) DIN 53211; beaker opening 4 mm
(4) Method described in Example 5
(5) DIN 4768

TABLE 2

Performance of the aggregated matting agent

Application test in nitrocellulose paint

| Parameter | Unit | Standard SYLOID ED5 | Example 2 |
|---|---|---|---|
| Particle size $[d_{v,50}]$ (1) | μm | 8.8 | 8.9 |
| Matting agent required for 30 gloss units (60° angle of incidence) (2) | % wt./wt. | 0.71 | 0.72 |
| Matting agent required for 40 gloss units (85° angle of incidence) (2) | % wt./wt. | 0.76 | 0.84 |
| Viscosity of the paint with 1% matting agent (3) | mPa · S | 361 | 372 |

(1) measured according to Helos; focal length 50 mm; median of the volume distribution (DIN 66141)
(2) DIN 67530
(3) DIN 53211; beaker opening 4 mm

TABLE 3

Performance of the aggregated matting agent

Application test in nitrocellulose paint

| Parameter | Unit | Standard SYLOID ED5 | Example 3 | Example 4 |
|---|---|---|---|---|
| Particle size $[d_{v,50}]$ (1) | μm | 8.8 | 8.9 | 9.3 |
| Matting agent required for 30 gloss units (60° angle of incidence) (2) | % wt./wt. | 0.61 | 0.53 | 0.51 |
| required for 40 gloss units (85° angle of incidence) | % wt./wt. | 0.65 | 0.60 | 0.47 |
| Viscosity of the paint with 1% matting agent (3) | mPa · S | 357 | 417 | 402 |
| Surface roughness Ra at the same gloss (4) | μm | 0.65 | 0.60 | 0.62 |

(1) measured according to Helos; focal length 50 mm; median of the volume distribution (DIN 66141)
(2) DIN 67530
(3) DIN 53211; beaker opening 4 mm
(4) DIN 4768

TABLE 4

Performance of the aggregated matting agent

Application test in alkyd paint

| Parameter | Unit | Standard SYLOID ED5 | Example 1 | TS 100 |
|---|---|---|---|---|
| Particle size $[d_{v,50}]$ (1) | μm | 8.8 | 9.2 | 9.1 |
| Matting agent required for 30 gloss units (60° angle of incidence) (2) | % wt./wt. | 2.25 | 1.85 | 2.00 |
| Viscosity of the paint with 1% matting agent (3) | mPa · S | 111 | 107 | 142 |
| Dispersibility (4) (low shear) | | good | good | poor |
| Surface roughness Ra at the same gloss (5) | μm | 0.3 | 0.35 | 0.3 |

(1) measured according to Helos; focal length 50 mm; median of the volume distribution (DIN 66141)
(2) DIN 67530
(3) DIN 53211; beaker opening 4 mm
(4) Method described in Example 5
(5) DIN 4768

TABLE 5

Characterization of the particle stability
Particle size measurement according to different dispersion methods in the original paint (Example 1)
The dispersed sample is diluted prior to measurement using MIBK (methylisobutyl ketone)

| Product | Median after dispersion in the dissolution apparatus μm | Median after dispersion in the ball mill | Stability index Ratio of column 2/ column 1 |
|---|---|---|---|
| ED5 | 8.85 | 8.25 | 0.93 |
| ED5 | 8.83 | 8.32 | 0.94 |
| Example 1 | 9.24 | 8.8 | 0.95 |
| | 8.58 | 8.13 | 0.95 |
| Example 2 | 9.21 | 7.56 | 0.82 |
| (no binding agent) | 7.79 | 6.43 | 0.83 |

We claim:
1. Aggregated silica gel which has been produced from silica gel particles having a particle size of 1 to 20 μm, a surface area of 200 to 1000 m²/g and a specific pore volume of 0.4 to 2.5 ml/g wherein the aggregated silica gel comprises silica gel bound by a binding agent selected from the group consisting of synthetic or natural layered silicate, pyrolytic silicon dioxide and organic polymers soluble in water or dispersible in water selected from xanthane, carboxymethyl cellulose and polyacrylate.

2. Aggregated silica gel according to claim 1 in which the binding agent is a synthetic or natural phyllosilicate which is used in a ratio of 1:99 to 25:75 silicate:silica gel.

3. Aggregated silica gel according to claim 1 in which the binding agent is a pyrolytic silicon dioxide which is used in a ratio of 5:95 to 50:50 pyrolytic silicon dioxide:silica gel.

4. Aggregated silica gel according to claim 1 in which the binding agent is selected from xanthane, carboxymethyl cellulose and polyacrylates, which is used in a ratio of 0.5:99.5 to 15:85 organic polymer:silica gel.

5. Aggregated silica gel according to claim 1 which has been treated with 1 to 20% of a wax selected from the group consisting of polyethylene waxes, modified polyethylene waxes, mineral waxes, modified mineral waxes, and mixtures thereof.

6. Aggregated silica gel according to claim 2 which has been treated with 1 to 20% of a wax selected from the group consisting of polyethylene waxes, modified polyethylene waxes, mineral waxes, modified mineral waxes, and mixtures thereof.

7. Aggregated silica gel according to claim 3 which has been treated with 1 to 20% of a wax selected from the group consisting of polyethylene waxes, modified polyethylene waxes, mineral waxes, modified mineral waxes, and mixtures thereof.

8. Aggregated silica gel according to claim 4 which has been treated with 1 to 20% of a wax selected from the group consisting of polyethylene waxes, modified polyethylene waxes, mineral waxes, modified mineral waxes, and mixtures thereof.

9. Method for the production of an aggregated silica gel comprising aggregating silica gel particles having a particle size of 1 to 20 $\mu$m, a surface area of 200 to 1000 $m^2/g$, and a specific pore volume of 0.4 to 2.5 ml/q, wherein the aggregation takes place with a binding agent in a spray-dryer using a suspension containing 1 to 25% solids.

10. Method according to claim 9, wherein the spray-dried solids are subsequently air-classified.

11. Method according to claim 9, wherein the suspension to be spray-dried is adjusted to a pH value of 8 to 10.5.

12. Method according to claim 9, wherein a wax emulsion is added to the suspension prior to the spray-drying.

13. Method according to claim 9, wherein the wax emulsion is sprayed onto the spray-dried product and is subsequently dried.

14. Method according to claim 9 wherein the binding agent is a synthetic or natural phyllosilicate which is used in a ratio of 1:99 to 25:75 silicate:silica gel.

15. Method according to claim 9 wherein the binding agent is a pyrolytic silicon dioxide which is used in a ratio of 5:95 to 50:50 pyrolytic silicon dioxide:silica gel.

16. Method according to claim 9 wherein the binding agent is selected from xanthane, carboxymethyl cellulose and polyacrylates, which is used in a ratio of 0.5:99.5 to 15:85 organic polymer:silica gel.

17. A method for matting a coating comprising adding the aggregated silica gel of claim 1 to the coating.

18. A method of imparting anti-blocking to a polymer film comprising adding the aggregated silica gel of claim 1.

19. A method of clarifying beer comprising using the aggregated silica gel of claim 1.

* * * * *